United States Patent
Mulder et al.

(10) Patent No.: US 6,382,697 B1
(45) Date of Patent: May 7, 2002

(54) STAMPING REINFORCED POLYMERIC MOLDED ELBOW AND METHOD OF MANUFACTURE

(75) Inventors: Jason Mulder, Grandville; Michael Lanser, Holland, both of MI (US)

(73) Assignee: Innotec Corporation, Zeeland, MI (US)

( * ) Notice: Subject to any disclaimer, the term of this patent is extended or adjusted under 35 U.S.C. 154(b) by 0 days.

(21) Appl. No.: 09/725,581

(22) Filed: Nov. 29, 2000

(51) Int. Cl.⁷ ............................. B60J 3/00; B28B 7/22
(52) U.S. Cl. ................. 296/97.5; 296/97.9; 362/492; 269/255
(58) Field of Search ............... 296/97.9, 97.5, 296/97.12, 97.13; 362/492; 264/255

(56) References Cited

U.S. PATENT DOCUMENTS

| | | | |
|---|---|---|---|
| 4,363,511 A | | 12/1982 | Viertel et al. ............. 296/97 |
| 4,756,570 A | * | 7/1988 | Cooper ................ 296/97.13 |
| 5,143,678 A | | 9/1992 | Prillard .................. 264/255 |
| 5,320,399 A | * | 6/1994 | White et al. ........... 296/97.12 |
| 5,486,033 A | * | 1/1996 | Lecorvaisier et al. .... 296/97.13 |
| 5,603,547 A | * | 2/1997 | Finn et al. ............... 296/97.1 |
| 5,820,197 A | | 10/1998 | Lanser .................. 296/97.12 |
| 5,857,728 A | | 1/1999 | Crotty, III .............. 269/97.9 |
| 6,059,348 A | * | 5/2000 | Viertel et al. ............ 296/97.9 |
| 6,139,083 A | * | 10/2000 | Fischer et al. ......... 296/97.11 |

FOREIGN PATENT DOCUMENTS

DE          3916560         5/1989

* cited by examiner

Primary Examiner—Joseph D. Pape
(74) Attorney, Agent, or Firm—Price, Heneveld Cooper, DeWitt & Litton

(57) ABSTRACT

A stamped reinforced visor elbow having a metal reinforcing member that holds electrical conductors encased in a molded polymeric material. The reinforcing member is generally U-shaped in cross section and can be formed by stamping. The reinforcing member provides support for the visor elbow while providing a channel for electrical conductors. The reinforced visor elbow is made by forming a metal reinforcing member through a stamping die, placing one or more conductors into a recess created in the reinforcing member and the steps of molding a polymeric material over the reinforcing member while holding the wires to form the reinforced visor elbow.

24 Claims, 2 Drawing Sheets

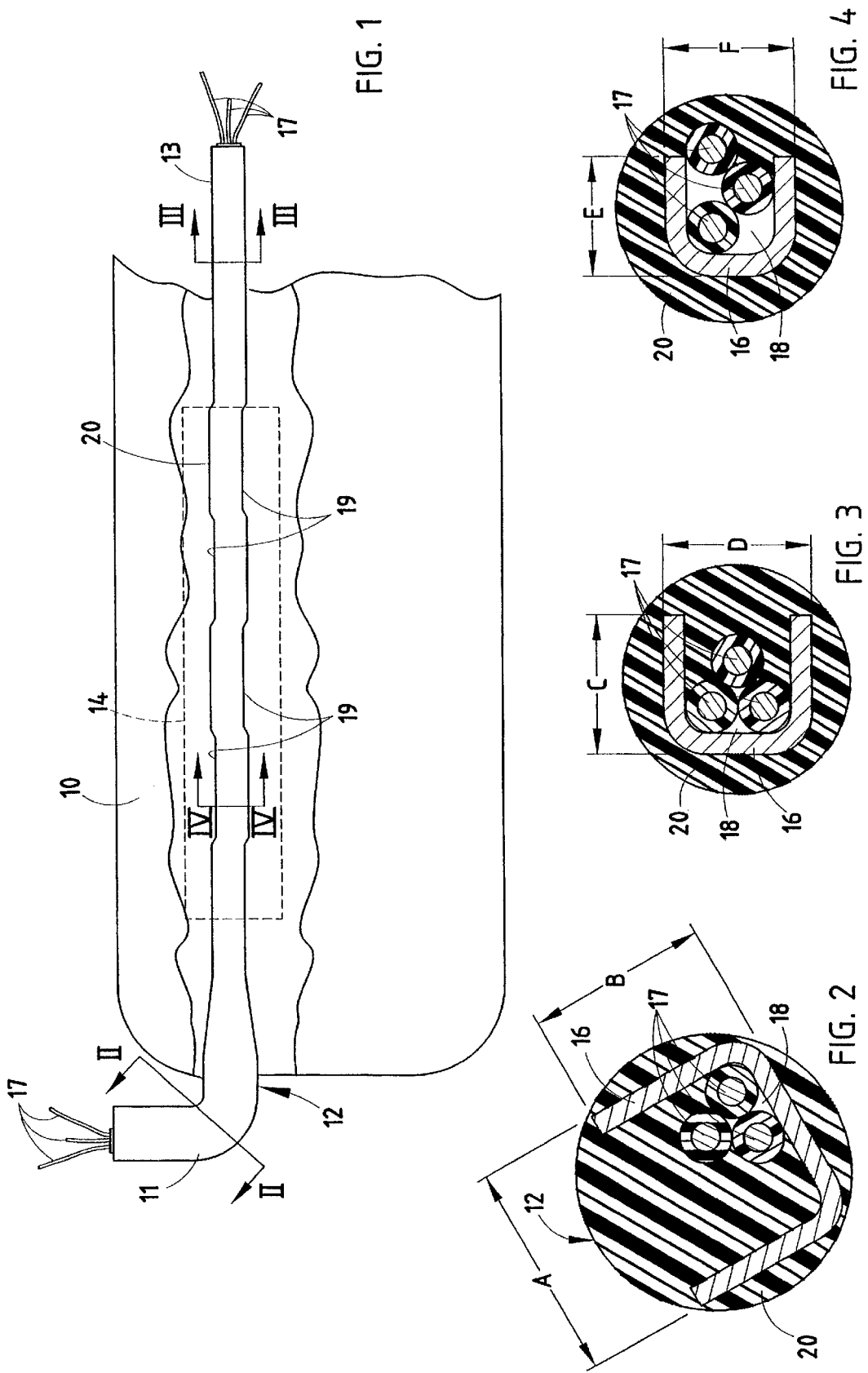

STAMPING REINFORCED POLYMERIC MOLDED ELBOW AND METHOD OF MANUFACTURE

BACKGROUND OF THE INVENTION

The present invention pertains to automotive visors, and particularly a visor elbow for mounting visors to a vehicle.

Vehicle visors are typically mounted to the headliner of a vehicle and supported by the underlying sheet metal roof using an elbow bracket which permits the visor to be moved from a forward windshield position to a side window, depending upon driving conditions. There exists numerous visor brackets and torque controls that are designed to allow a visor to pivot from a stored position adjacent the vehicle headliner to selective lower use positions. U.S. Pat. Nos. 5,820,197; 5,765,897; and 4,614,196 are among those patents that disclose vigor mounts and/or torque controls for pivoting a visor.

Visors frequently include a variety of accessories, such as illuminated vanity mirrors, garage door opening transmitters, cellular telephones and the like. Such accessories integrated into visor bodies add to the weight of the visor. Furthermore, such accessories require an electric source for powering the accessories. Most of the accessories are powered by pairs of electrical conductors which are themselves connected to feed wires hidden in the headliner. These conductors may pass to one side of the sun visor support arm, but for reasons of appearance it is preferable to hide them in hollow metal pivot rods which may act as the second conductor which is connected to the ground.

Another prior method of making a support arm is to mold plastic material over a solid metal insert. The insert then constitutes one of the electrical feed conductors for the sun visor. In this case, the second conductor is provided via the other sun visor support rod which holds the end that is distant from the support arm by cooperating with a clip fixed to the roof. This solution has the advantage of providing a visor support which is particularly strong, however it suffers from the drawback of requiring good electrical contact to be made with the clip when the accessories are to be powered, and power is not available unless the rod is engaged in the clip.

Visor support arms also have had two conductors passing along the inside of a molded polymeric material extending over a portion of the conductors in such a manner as to encase the conductors. In one proposal, the polymeric material is molded over at least a portion of the conductors by injection in two stages. In a first stage, a polymeric material is molded over two electrical conductors in a first mold to obtain a support arm blank in which the material constitutes a block with the portion of the conductors. The blank has at least a portion which is smaller in section than a corresponding section of said support arm. The second stage consists of the blank being overmolded by polymeric material to complete the support arm. The drawback of this system is that it does not provide sufficient mechanical support for heavier visors which contain electrical accessories or glass mirrors and it requires several steps in the manufacturing process.

Other visor elbows have been suggested which are made of hollow tubular members supporting conductors for an illuminated vanity mirror and overmolded to complete the elbow, or a multiple component visor rod with a solid core with recesses for receiving conductors over which a sleeve is molded.

There exists a need, therefore, for a visor elbow which is relatively inexpensive and capable of providing a source of electricity for visor accessories, yet providing additional support for the added weight of visors having accessories mounted therein. Further, with the increasing sensitivity to the cost of vehicle components by manufacturers, it is desirable to have a visor elbow which is relatively inexpensive and requires less materials.

SUMMARY OF THE INVENTION

The stamping reinforced polymeric molded elbow of the present invention solves the need for a relatively inexpensive elbow which is capable of satisfying the design criteria for modem vehicle visors. It accomplishes this goal by providing a visor elbow made with a metallic reinforcement over which a polymeric elbow is molded. The reinforcement is preferably shaped to provide strength and to allow conductors to extend therein. Further, the stamped reinforcement may serve as a carrier in the method of manufacturing such an elbow.

These and other features, advantages and objects of the present invention will be further understood and appreciated by those skilled in the art by reference to the following specification, claims and appended drawings.

BRIEF DESCRIPTION OF THE DRAWINGS

FIG. 1 is a plan view of a visor and a visor elbow embodying the present invention shown partly in phantom form and partly broken away;

FIG. 2 is an enlarged cross section of the elbow of FIG. 1, taken along section line II—II of FIG. 1;

FIG. 3 is an enlarged cross section of the elbow of FIG. 1, taken along section line III—III of FIG. 1;

FIG. 4 is an enlarged cross section of the elbow of FIG. 1, taken along section line IV—IV of FIG. 1.

DETAILED DESCRIPTION OF THE PREFERRED EMBODIMENT

Figure 5:
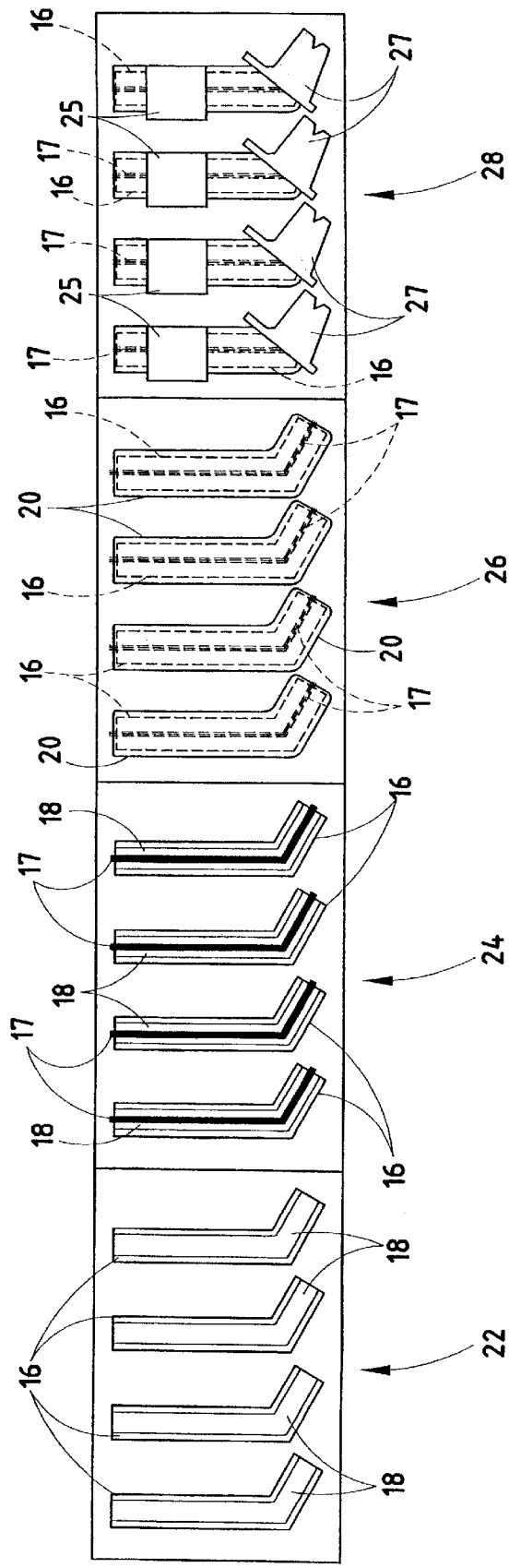
FIG. 5 is a diagram of the method of manufacturing the visor elbow of the present invention.

Referring initially to FIG. 1, there is shown a vehicle visor 10 having a stamped reinforced molded visor elbow 12 mounted to the body of visor 10 by a torque clip 14, such as disclosed in U.S. Pat. No. 5,820,197, the disclosure of which is incorporated herein by reference. The molded visor elbow 12 is generally L-shaped and has a wider portion near its end 11 where the stamped reinforced visor elbow 12 extends upwardly to a conventional mounting bracket (not shown) that attaches the visor 10 to the vehicle. FIG. 2 is a sectional view of the elbow 12 which includes a generally U-shaped (in cross section) stamped metal reinforcing member 16, made of cold-rolled steel, 0.030 inches thick, at the widest point of the stamped reinforced visor elbow 12 over which a polymeric material 20 is molded, encasing conductors 17 (when employed) and reinforcing member 16. The metal that is used can be any metal, including aluminum and steel. The metal reinforcing member 16 has a recess 18 which holds the electrical conductors 17. In the embodiment shown, recess 18 includes conductors for accessories, such as an illuminated vanity mirror and a display and/or transmitter, such as taught in U.S. Pat. No. 5,926,087, the disclosure of which is incorporated herein by reference. The dimensions of this reinforcing member is about 12.24 mm (dimension A) by about 3.096 mm (dimension B) at its widest part.

FIG. 3 is a sectional view of the molded visor elbow 12, showing the reinforcing member 16 near the opposite end 13 of the stamped reinforced visor elbow 12. The dimensions of the reinforcing member 16 near the end 13 is about 4.672 mm (dimension C) to about 4.557 mm (dimension D). Similarly, FIG. 4 is a sectional view of the molded visor elbow 12 showing the reinforcing member 16 near the middle of the stamped reinforced visor elbow 12 with dimensions of about 3.938 mm (dimension E) to about 2.992 mm (dimension F).

The generally U-shaped (in cross section) metal reinforcing member 16 may vary in shape throughout the visor elbow. Thus, the reinforcing member 16 may be of any shape at any point in the visor elbow 12 that holds the electrical conductors 17 and reinforces the visor elbow 12. The illustrated dimensions for the metal reinforcing member 16 may vary depending on the size of the visor elbow 12 and the shape of the metal reinforcing member 16. Thus, if a different shape is chosen for the metal reinforcing member 16, the dimensions may vary significantly from those illustrated in the drawings.

The polymeric material 20 used to complete the elbow structure 12 can be any suitable polymeric material, including Pom Acetal, UV 90, Celcon®, polyester nylon (filled or unfilled), and Delrin®. The generally U-shaped metal reinforcing member may optimally be C-shaped, V-shaped or shaped in another way to provide a recess 18 for nesting one or more conductors 17 and for providing a reinforcing feature for the completed elbow 12.

The method of the present invention is shown in FIG. 6 and begins with step 22 in which the generally U-shaped (in cross-section) reinforcing member 16 is formed by stamping. The stamping die forms the metal reinforcing member 16 which has, as noted in FIGS. 2–4, various widths throughout the elongated generally L-shaped stamped reinforced member 16. In step 24, the electrical conductors 17 are placed into the recess 18 of the metal reinforcing member 16. Step 26 involves the polymeric material 20 being molded over the metal reinforcing member 16 to result in the elbow 12. The molding step is performed using conventional injection molding techniques with dies shaped to provide a visor elbow which conforms to a particular visor into which it will be subsequently incorporated. The assembly is completed by the addition in step 28 of a torque clip 25 and a mounting bracket 27. This assembly is then incorporated into the body of a visor 10 with the electrical conductors providing electrical power or signals to the visor accessories.

A visor elbow 12 made according to his invention withstands a pull down torque of about 1.4N*M, sufficient to support visors with electrical accessories. A visor elbow 12 made according to this invention may also have the reinforcing member 16 overmolded with polymeric material 20 without conductors 17 for use with visors 10 that do not have electrical accessories.

The above description is considered that of the preferred embodiment only. Modification of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the doctrine of equivalents.

The invention claimed is:

1. A reinforced elbow for an automobile visor comprising:
   a reinforcing member having a generally U-shaped cross section;
   at least one electrical conductor placed on said reinforcing member; and
   a polymeric material encapsulating said reinforcing member and said at least one electrical conductor.

2. A reinforced elbow for an automobile visor comprising:
   a reinforcing member having a generally U-shaped cross section;
   at least one electrical conductor placed on said reinforcing member; and
   a polymeric material encapsulating said reinforcing member and said at least one electrical conductor, wherein said reinforcing member is made of metal.

3. The apparatus as defined in claim 2, wherein said metal is cold-rolled steel.

4. The apparatus as defined in claim 3, wherein said steel is about 0.030 inches thick.

5. The apparatus as defined in claim 4, wherein said reinforcing member is formed by stamping.

6. The apparatus as defined in claim 1, wherein said reinforced elbow is L-shaped.

7. A reinforced elbow for an automobile visor comprising:
   a reinforcing member defining an elongated channel;
   a plurality of electrical conductors placed in said channel of said reinforcing member; and
   a polymeric material encapsulating said reinforcing member and said at least one electrical conductor.

8. The apparatus as defined in claim 7, wherein said reinforcing member is generally U-shaped in cross section.

9. A reinforced elbow for an automobile visor comprising:
   a metal U-shaped reinforcing member;
   at least one electrical conductor placed on said reinforcing member; and
   a polymeric material encapsulating said reinforcing member and said at least one electrical conductor.

10. The apparatus as defined in claim 9, wherein said metal is cold-rolled steel.

11. The apparatus as defined in claim 10, wherein said steel is about 0.030 inches thick.

12. The apparatus as defined in claim 11, wherein said polymeric material is nylon.

13. The apparatus as defined in claim 11, wherein said polymeric material is Delrin®.

14. A reinforced elbow for an automobile visor comprising:
   an internal non-tubular reinforcing member defining an elongated channel and having a wall defining a thickness;
   at least a portion of said thickness being generally uniform in cross section; and
   a polymeric material encapsulating said reinforcing member.

15. The apparatus as defined in claim 14, wherein said reinforcing member is generally U-shaped in cross section.

16. The apparatus as defined in claim 15, wherein said reinforcing member is made of metal.

17. The apparatus as defined in claim 16, wherein said metal is cold-rolled steel.

18. The apparatus as defined in claim 17, wherein said steel is about 0.030 inches thick.

19. A vehicle visor comprising:
   a visor body;
   a visor elbow having an internal reinforcing member having a generally U-shaped cross section;
   at least one electrical conductor placed on said reinforcing member;

a polymeric material encapsulating said reinforcing member and said at least one electrical conductor; and a torque clip for mounting said elbow to said visor body.

20. A method of making a reinforced elbow for an automobile visor comprising the steps of:

forming a reinforcing part from a stamping die;

placing at least one electrical conductor into said reinforcing part; and molding a polymeric material over said reinforcing part and said electrical conductor.

21. The method according to claim 20, wherein said reinforcing member has a generally U-shaped cross section.

22. The method according to claim 21, wherein said forming step is stamping said reinforcing part of metal.

23. A reinforced elbow for an automobile visor comprising:

a reinforcing member having a generally U-shaped cross section, defining an elongated channel;

a plurality of electrical conductors placed in said channel of said reinforcing member; and a polymeric material encapsulating said reinforcing member and said at least one electrical conductor.

24. A method of making a reinforced elbow for an automobile visor comprising the steps of:

forming a reinforcing part by bending a piece of metal;

placing at least one electrical conductor into said reinforcing part; and molding a polymeric material over said reinforcing part and said electrical conductor.

* * * * *

UNITED STATES PATENT AND TRADEMARK OFFICE
CERTIFICATE OF CORRECTION

PATENT NO. : 6,382,697 B1
DATED : May 7, 2002
INVENTOR(S) : Jason Mulder et al.

It is certified that error appears in the above-identified patent and that said Letters Patent is hereby corrected as shown below:

Column 1,
Line 17, "4,614,196" should be -- 4,634,196 --.

Column 18,
Line 18, "vigor" should be -- visor --.

Signed and Sealed this

Thirty-first Day of December, 2002

JAMES E. ROGAN
*Director of the United States Patent and Trademark Office*